Figure 1:
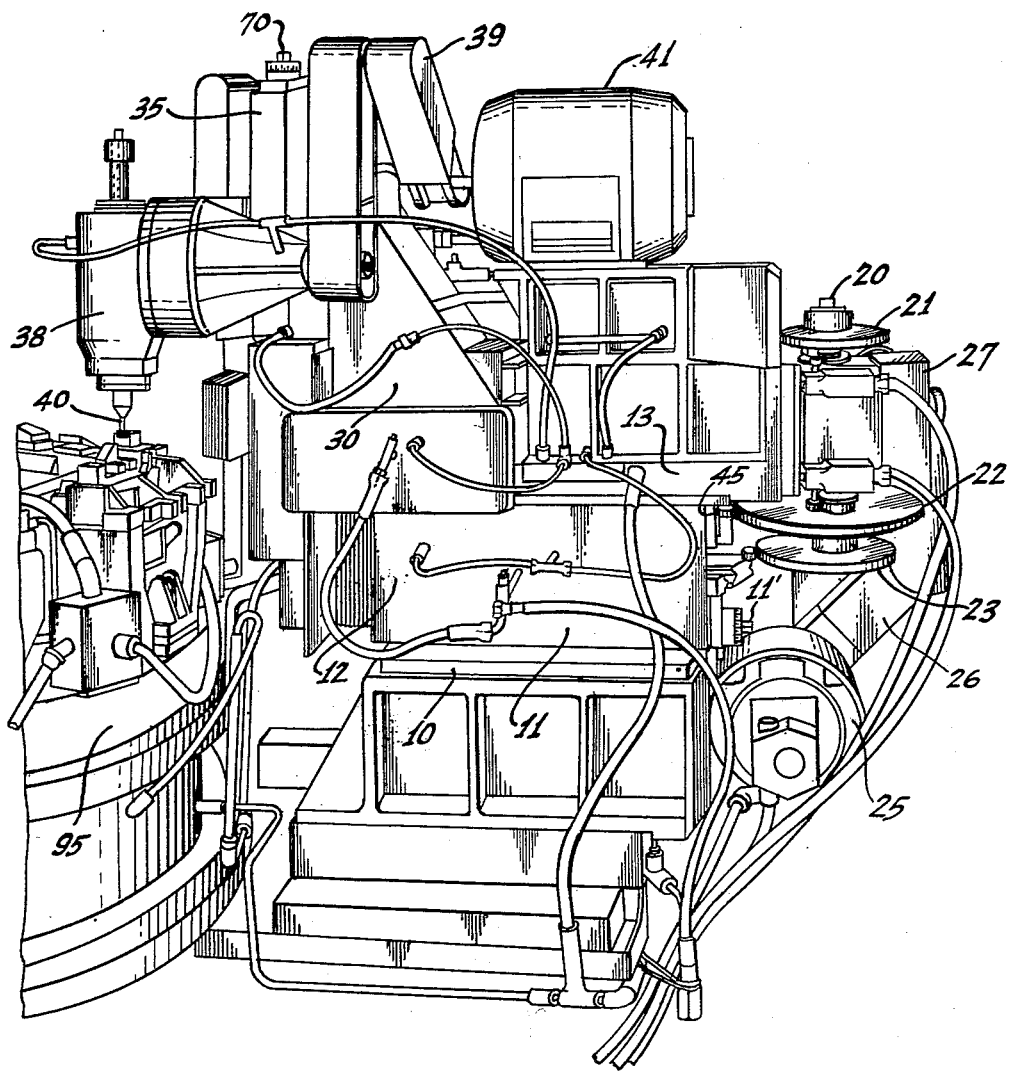

Feb. 16, 1965   N. HOGLUND   3,169,448
APPARATUS FOR FORMING CONTOURS
Filed Feb. 14, 1963   7 Sheets-Sheet 1

INVENTOR.
NILS HOGLUND
BY
William A. Zalesak
ATTORNEY

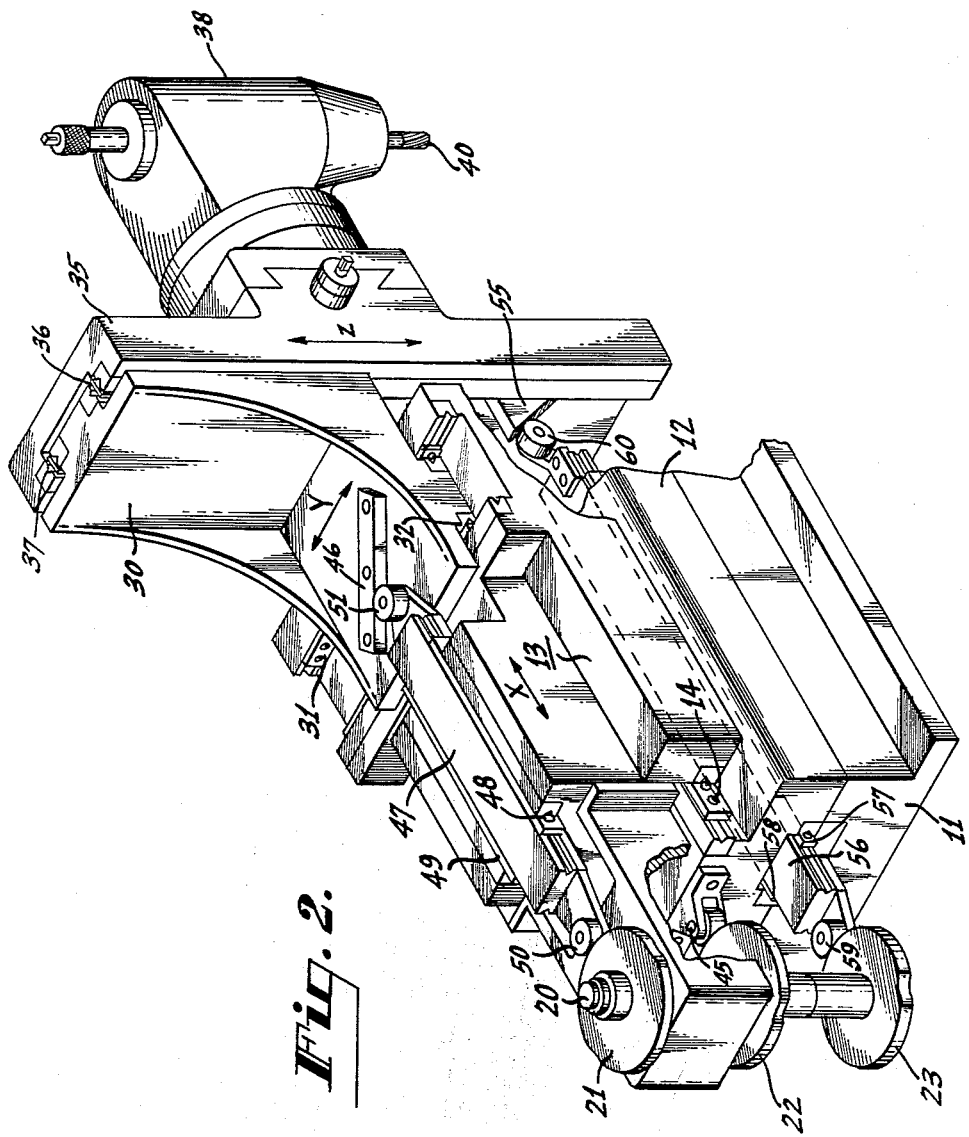

INVENTOR.
NILS HOGLUND

INVENTOR.
NILS HOGLUND

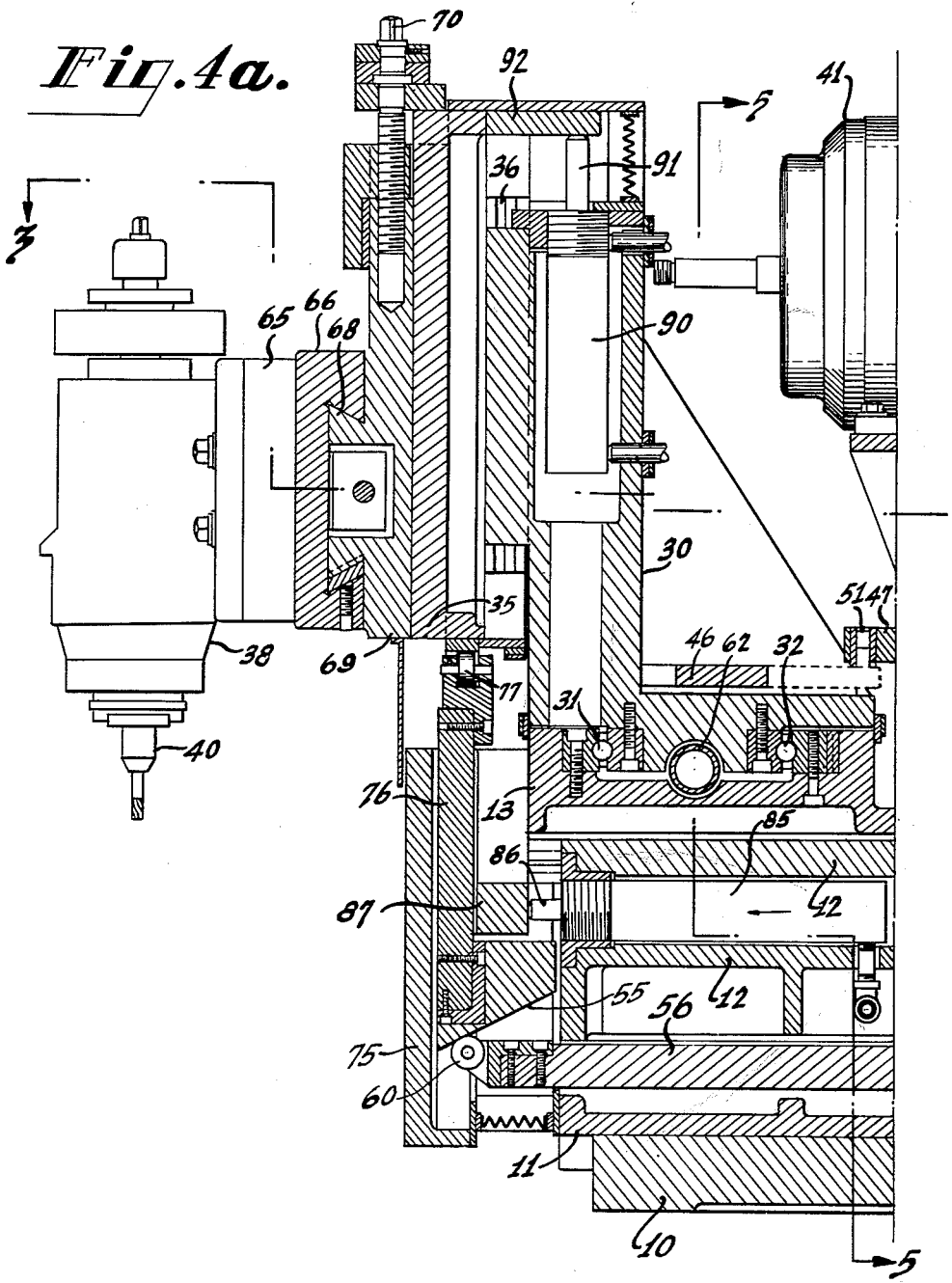

INVENTOR.
NILS HOGLUND
BY
William A. Zalesak
ATTORNEY

Feb. 16, 1965  N. HOGLUND  3,169,448
APPARATUS FOR FORMING CONTOURS
Filed Feb. 14, 1963  7 Sheets-Sheet 7

INVENTOR.
NILS HOGLUND
BY
William A. Zalesak
ATTORNEY

United States Patent Office 3,169,448
Patented Feb. 16, 1965

3,169,448
APPARATUS FOR FORMING CONTOURS
Nils Hoglund, 296 Hartshorn Drive, Short Hills, N.J.
Filed Feb. 14, 1963, Ser. No. 258,390
9 Claims. (Cl. 90—13)

My invention relates to apparatus for moving an element in all dimensions particularly for forming contours on a work piece in a plurality of dimensions, and more particularly to improvements in a mechanism for controlling the path of milling cutters, for example.

More particularly, my invention relates to apparatus for forming contours in three dimensions, particularly a milling apparatus capable of performing three dimension operations of different contour, and which can be varied, at each of a plurality of work positions, preferably utilizing a turret provided with a plurality of work positions. Such apparatus is required, for example, to provide the needed contours on gun parts and other complex parts which must be made in mass production industries at a very rapid rate.

It is desirable to have such an apparatus which is capable of contour surface milling, flat surface milling, chamfering, multiple counterboring, pocket machining, multiple spotfacing and milling O ring seal grooves.

Apparatus made according to my invention can be used individually as a single unit or more than one can be used in a plurality of positions with a turret, for forming completely different contours at each of a plurality of work positions.

Briefly, apparatus made according to my invention, includes a supporting member or base upon which a subslide is mounted for permitting the entire apparatus to be accurately adjusted toward or from the work piece. A subhousing is secured to the subbase. The subslide and subhousing support the various slides and cams forming the apparatus made according to my invention.

A housing is slidably mounted by means of ball bearing assemblies on the subhousing for movement toward and from the work piece. There are a plurality of cams, for example three, rotatably mounted on a spindle or cam shaft at one end of the housing, the shaft being positioned transversely of the movement of the housing, that is, in a normally vertical position. A jointed belt drive mechanism is connected between a fixed motor and the cam shaft for rotating the shaft and the cams while still permitting movement of the housing and cams relative to the motor. A first slide is mounted at the other end of the housing for movement transversely of the movement of the housing, that is, horizontally. A second or tool slide for supporting a working member, for example, a drill or miller is mounted on the first slide for movement transversely of the first slide, that is, vertically. A third slide is slidably mounted on the subslide and subhousing for movement parallel to the housing. This third slide has a cam follower at each end thereof for contact with one of the rotatable cams and a cam mechanism for controlling movement of the tool slide. A fourth slide is slidably mounted on the housing and has movement parallel to the third slide and the housing. At each end of this fourth slide are cam followers, one contacting one of the rotatable cams, and the other follower contacting a cam mounted on the first slide for controlling movement of this first slide and the tool horizontally of the movement of the housing. Fixed to the subhousing is a cam follower which contacts another of the rotatable cams. This controls the in-and-out movement of the housing and the first and second slides. All cams and cam followers are biased against each other by constant pressure hydraulic mechanisms. As a result, when the rotatable cam spindle is driven, the tool is made to move in all directions along a path determined by the various cam surfaces.

Figure 3A:
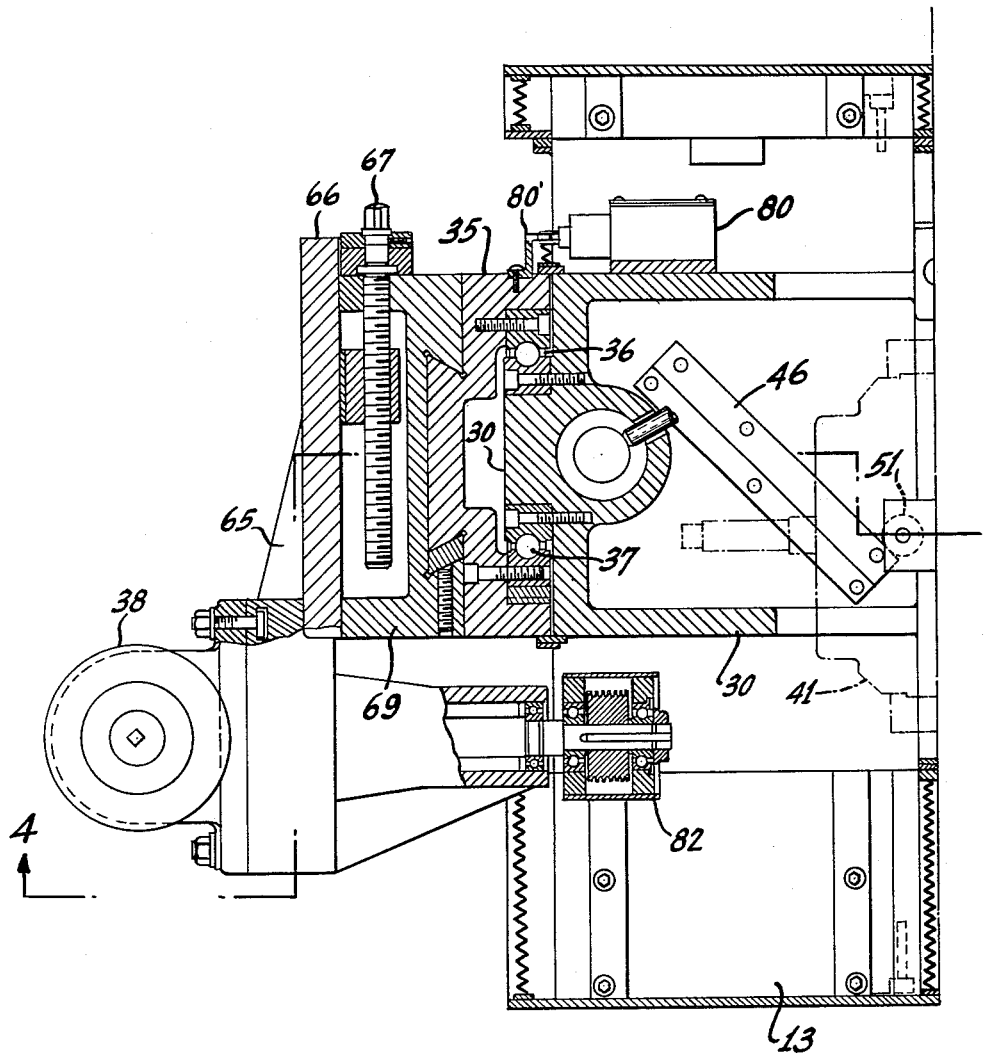
Figure 3B:
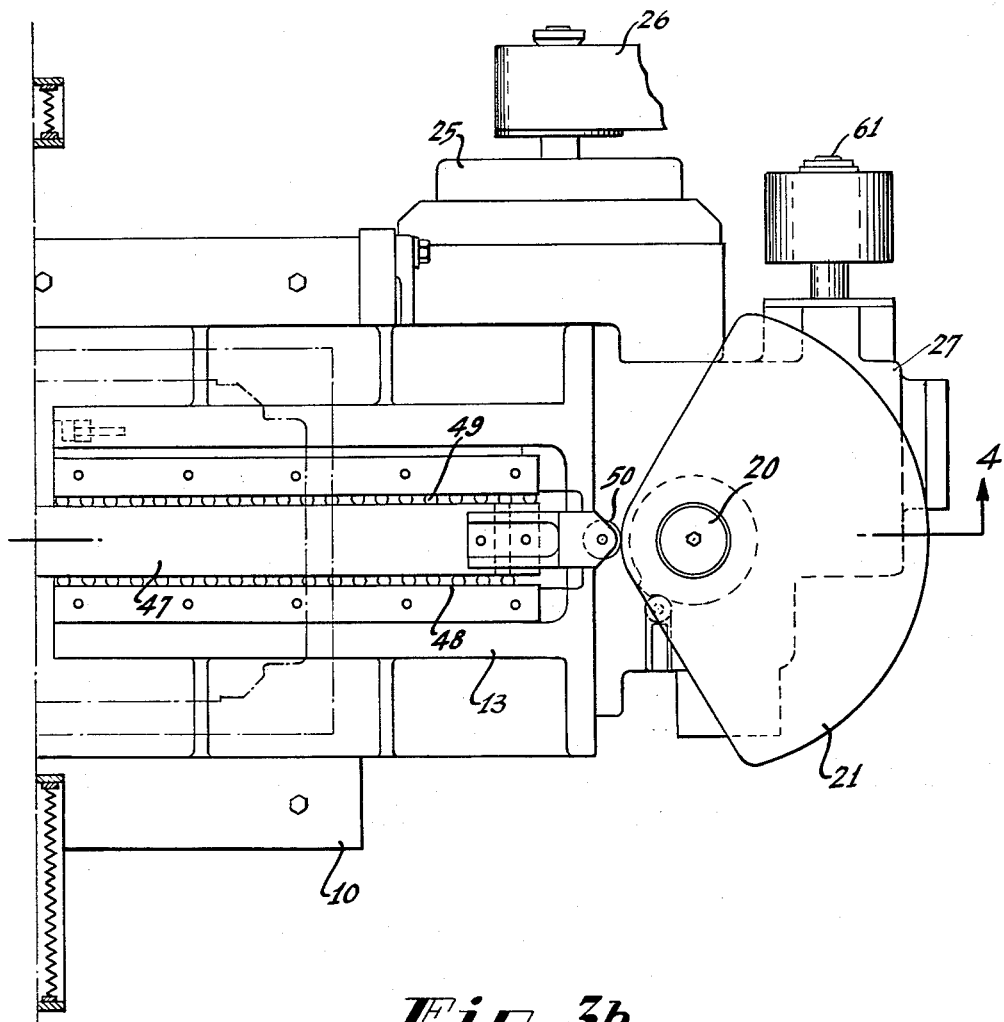
Figure 4B:
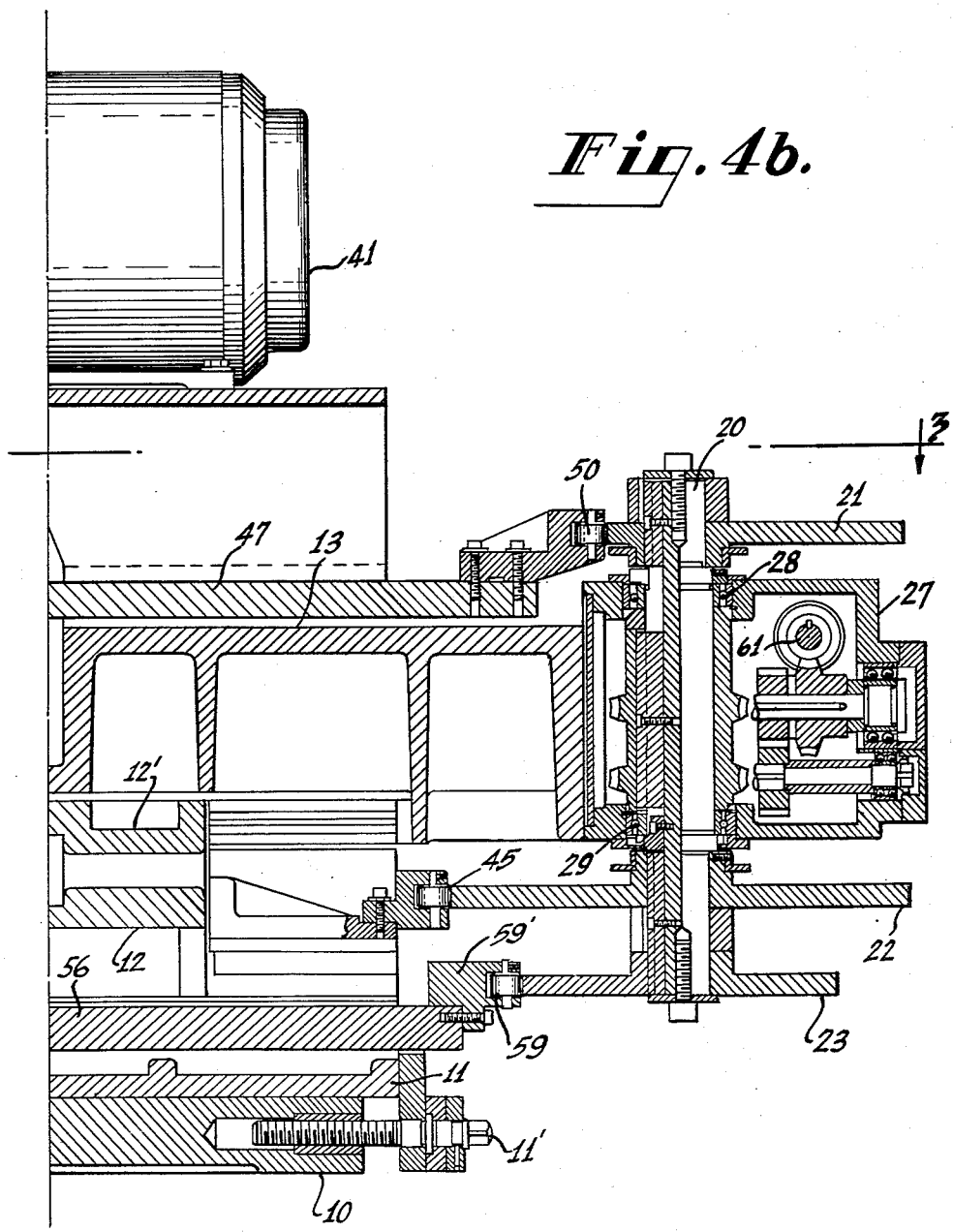

In the drawings:
FIG. 1 is a perspective view showing apparatus made according to my invention and capable of use with a turret indexable to a plurality of work positions;
FIG. 2 is a perspective shown schematically and with parts broken away to show details of construction and showing relative movement of the parts;
FIGS. 3a and 3b are plan views with parts removed and taken along the line 3—3 of FIGS. 4a and 4b;
FIGS. 4a and 4b are vertical sections taken along the line 4—4 of FIGS. 3a and 3b, and 4—4 of FIG. 5; and
FIG. 5 is a vertical section taken along the line 5—5 of FIG. 4a.

Figure 5:
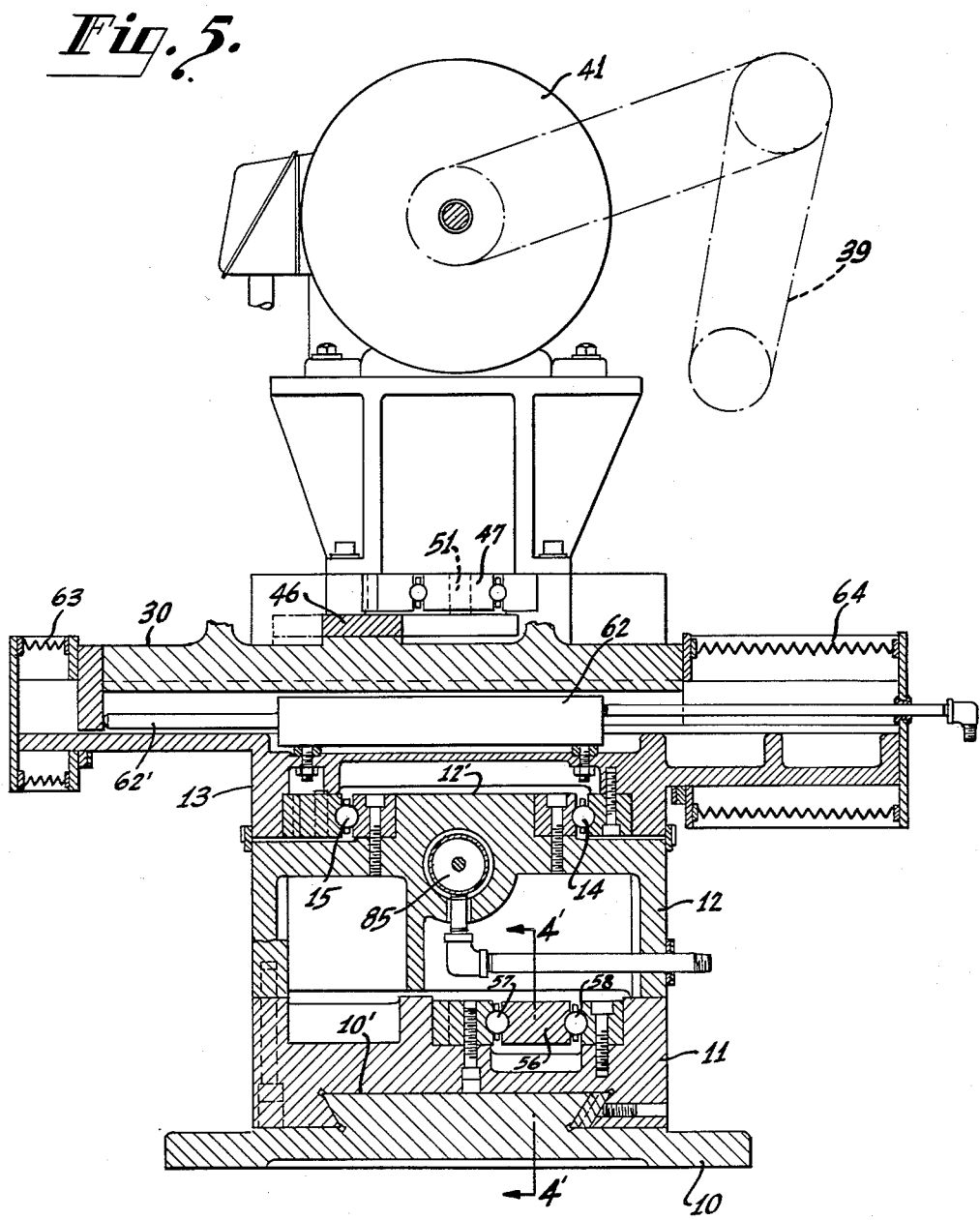

Referring now to FIGS. 1, 2, and 5, apparatus made according to my invention, includes a base plate 10 on which is mounted a subslide 11 and a subhousing 12. A slide or slide housing 13 is slidably supported in the subhousing 12 by means of ball bearing assemblies 14 and 15. Mounted at one end of the slide housing 13 is a rotatable shaft 20 upon which are supported and fixed the circular cams 21, 22 and 23. The motor 25 which is stationary is connected to the shaft 20 by means of the link belt drive 26 and a gear train within the gear box or housing 27. Since the cams are all fixed to the same shaft, no error in the motion of the shaft will be caused by back lash or looseness between the three cams. The angular displacement of the cams will therefore be identical relative to the corresponding followers contacting the individual cams.

Mounted at the other end of the slide housing 13 is the slide mechanism 30 mounted on the bearing assemblies 31 and 32. This slide mechanism moves transversely of the movement of the housing slide 13. The tool slide 35 carrying the tool chuck 38 and tool 40 is slidably supported on slide mechanism 30 by ball bearing assemblies 36 and 37 for movement transversely of slide 30 or vertically. The tool chuck 38 is driven by motor 41 through the jointed belt drive mechanism 39.

To provide movement of the various slides heretofore mentioned to cause the milling tool 40 to follow the desired path, slides, cams and cam followers to be described are provided.

The subhousing 12 has rotatably fixed thereto a cam follower 45 which contacts cam 22 on spindle 20. As cam 22 rotates housing 13 will move as indicated by the double headed arrow shown thereon, that is, this provides the X motion for the tool.

The slide mechanism 30 is provided with a cam 46 secured thereto. The slide housing 13 slidably supports a slide 47 thereon by means of the ball bearing assemblies 48 and 49. Mounted at the ends of slide 47 are the roller cam followers 50 and 51 which contact the circular cam 21 and the cam 46. As cam 21 rotates it causes slide 47 to move toward slide 30 causing slide 30 to move as indicated by the double headed arrow show thereon that is horizontally and transversely of the slide housing 13. This movement gives the tool 40 its Y movement.

To give the tool 40 its vertical or Z motion, I provide the tool slide mechanism 35 provided with a ratio cam 55 and to be described in more detail below. A slide 56 is slidably mounted in the subslide 11 and subhousing 12 in ball bearing assemblies 57 and 58. Roller cam followers 59 and 60 are mounted at the ends of the slide 56 contacting circular cam 23 and ratio cam 55. As slide 56 moves toward and from the tool slide 35, it causes vertical up-and-down movement of tool 40. Constant pressure hydraulic mechanism to be described will bias the cams and cam followers into engagement.

The details of one form of apparatus made according to my invention will now be described, referring particularly to FIGS. 4a, 4b, and 5.

As pointed out above, the apparatus is mounted on a base plate 10, having a dove tail slide guide 10' thereon. The subslide 11 mounted on guide 10' is adjustable by means of adjusting screw 11' connected between the base plate 10 and subslide 11, to permit accurate and minute positioning of the entire apparatus relative to a work piece. Positioned over and secured to the subslide 11 is the subhousing member 12 provided with the slide guide 12' which slidably supports the slide housing 13 thereon by means of ball bearing assemblies 14 and 15.

One end of the slide housing 13 is provided with the shaft 20 rotatably mounted and supported in ball bearing ring assemblies 28 and 29. The gear box 27 in which shaft 20 is supported, contains a back lash assembly connected between the drive shaft 61 and shaft 20 by means of the gear train shown which includes worm and pinion gears. It will not be further described since it is not the subject matter of the present application. The circular cams 21, 22 and 23 are fixed to the shaft 20 to be rotated thereby.

The slide mechanism for supporting the tool and providing movement of the tool transversely of the slide housing 12, vertically and horizontally are mounted at the end of the housing opposite the circular cams (FIGURES 3a, 4a, and 5).

Slide mechanism 30 is slidably mounted on slide housing 13 by means of ball bearing assemblies 31 and 32 and is biased to the left in FIG. 5 by hydraulic cylinder 62 and piston rod 62' to keep cam 46 and follower 51 in contact with each other. Dust covers 63 and 64 connected between slide 30 and slide housing 13 protect the bearing assemblies.

The vertical or Z motion of the tool 40 is accomplished by means of the slide mechanism best shown in FIGS. 3a and 4a. The slide 35 is slidably supported on slide 30 by means of ball bearing assemblies 36 and 37. The tool chuck 38 is mounted on a bracket 65, attached to slide 66 for positioning and fine adjustment horizontally by screw 67 along slide guide 68. The slide guide 68 is part of slide 69 which can be adjusted vertically by screw 70 on slide 35.

A housing extension 75 is attached to housing 13 and slidably supports slide 76 in the extension 75 by means of ball bearing assemblies not shown. A roller follower 77 is rotatably mounted at the upper end of slide 76 and contacts the bottom of slide 35 permitting relative movement of the slide 35 in the Y direction while at the same time applying a force in the upward direction to raise slide 35 when slide 76 is moved vertically as will be described, by roller follower 60 in contact with ratio cam 55.

The axis of rotation of rotating cam shaft 20, and the axis of rotation of each of the followers 45, 50 and 59 all lie in the same radial plane passing longitudinally through the axis of rotation of shaft 20, thus insuring angular accuracy of cams and followers. While slide 56, as viewed in FIG. 5, is offset to the right of section 4—4, the follower support 59' is so shaped that follower 59 is supported with its axis of rotation in the radial plane referred to.

The above apparatus may utilize an electrical system which causes automatic indexing of the turret 95 (FIG. 1) and controls the starting and stopping of the milling apparatus at each station. This control can be accomplished by microswitches 80 controlled by trippers 80' such as shown in FIG. 3a.

The circular cam shaft 20 is driven by means of the gear train in gear box 27 connected through drive shaft 61 by motor 25 and belt link connection 26. Tool 40 is driven by motor 41 mounted on slide housing 13 and connected thereto by link belt 39 as shown in FIGS. 1, 3a and 5. This permits tool 40 to move transversely of the motor 41.

To facilitate quick movement of tool 40 in a vertical direction toward and from a work piece, I provide a hydraulic cylinder 90 fixed to slide 30 and having a piston rod 91. The rod 91 abuts member 92 fixed to the slide 35.

When the screws 11', 67 and 70 have been adjusted to properly position the tool 40 relative to a work piece, the motors 25 and 41 are energized driving the cam shaft 20 to rotate cams 21, 22 and 23. Cam 22 co-operating with follower 45 causes slide housing 13 to move inwardly and outwardly of the work supporting turret. The hydraulic cylinder 85, is provided with the piston rod 86 to push against the member 87 which is fixed to slide housing 13. This action maintains the cam 22 and follower 45 in contact as the cam rotates. As has been pointed out above, cam 23 contacts follower 59 on slide 56 which in turn controls vertical movement of the tool 40 by means of follower 60, ratio cam 55, slide 76, and follower 77. The weight of the tool and tool slide keeps the elements in contact with each other. As pointed out above, the movement of the tool along the Y axis is controlled by cam 21, follower 50, slide 47, follower 51 and cam 46 on slide 30.

By changing the angle of the ratio cams and the shape of the rotatable cams, the path of the tool can be changed to form for practical purposes any kind of contour.

What is claimed is:

1. Apparatus for forming contours in three dimensions including a base, a housing slidably mounted on said base, a plurality of cams rotatably mounted on said housing, a first slide on said housing movable transversely of the movement of said housing and a tool slide on said first slide movable transversely of said first slide, cam means associated with each of said first and tool slides for controlling movement thereof, a slide on said base and a slide on said housing contacting the cam means for controlling movement of said first and tool slides, one of the rotatable cams on said housing contacting a portion on said base for controlling movement on said housing, other of the rotatable cams contacting portions on the slides on said base and said housing for controlling movement of said first and tool slides, said portions lying substantially in a common plane.

2. Apparatus for forming contours in three dimensions including a supporting member, a housing slidably mounted on said supporting member and having movement in one direction, a plurality of cams mounted on said housing and rotatable on an axis transverse to the movement of said housing, a first slide on said housing movable transversely of the movement of said housing and a second slide on said first slide movable transversely of said first slide, cam means associated with each of said slides, third and fourth slides on said housing and said supporting member and movable parallel to the movement of said housing and contacting the cam means on the first and second slides, cam followers carried by said housing and said third and fourth slides providing portions lying substantially in a common plane, one of said rotatable cams on said housing co-operating with said supporting member portion and controlling movement on said housing, other of said rotatable cams contacting said third and fourth slide portions for controlling movement of said first and second slides, and a tool on said second slide.

3. Milling apparatus for forming contours in three dimensions including a supporting member, a housing slidably mounted on said supporting member, and having movement in one direction, a plurality of rotatable cams mounted on said housing, a first slide on said housing movable transversely of the movement of said housing and a tool slide on said first slide movable transversely of said first slide, cam means associated with each of said slides, third and fourth slides on said base and said housing and contacting the cam means on said first and tool slides, one of said rotatable cams on said housing co-operating with a portion on said supporting member and controlling movement on said housing, other of said rotatable cams contacting portions on said third and fourth slides for controlling movement of said first and tool slides, said portions lying substantially in a common plane.

4. Apparatus for forming contours in all dimensions, including a supporting base, a housing slidably mounted on said supporting base and movable in one direction, a plurality of rotatable cams mounted at one end of said housing, a first slide mounted at the other end of said housing and movable transversely of said one direction, a tool slide mounted on said first slide and movable transversely of the movement of said first slide, a third slide on said supporting member, a fourth slide on said housing, said third and fourth slides being movable relative to said housing parallel to said one direction, cam followers on one end of said third and fourth slides contacting some of said rotatable cams, and cam and follower means on said third and fourth slides and said housing and said first and tool slides, a follower on said supporting member and contacting another of said rotatable cams, means biasing said cams and cam followers into engagement, and means for rotating said rotatable cams.

5. Apparatus for forming contours in all dimensions including a supporting member, a housing slidably mounted on said supporting member and movable in one direction, a plurality of rotatable cams mounted at one end of said housing, a first slide mounted at the other end of said housing and movable transversely of said one direction, a tool slide mounted on said first slide and movable transversely of the movement of said first slide, a third slide on said supporting member, a fourth slide on said housing, said third and fourth slides being movable relative to said housing parallel to said one direction, cam followers at one end of said third and fourth slides contacting some of said rotatable cams, and cam follower means at the other end of said third and fourth slides, a cam on said tool slide contacting a follower on said fourth slide, a transfer slide on said housing having a cam contacting a follower on said third slide, a follower on said transfer slide contacting said tool slide, a follower on said supporting member and contacting another of said rotatable cams, means biasing said cams and cam followers into engagement, and means for rotating said rotatable cams.

6. Apparatus for forming contours in all dimensions including a supporting member, a housing slidably mounted on said supporting member and movable in one direction, a plurality of rotatable cams mounted at one end of said housing, a first slide mounted at the other end of said housing and movable transversely of said one direction, a tool slide mounted on said first slide and movable transversely of the movement of said first slide, a third slide on said supporting member, a fourth slide on said housing, said third and fourth slides being movable relative to said housing parallel to said one direction, cam followers at each end of said third and fourth slides, the cam followers at one end of said third and fourth slides contacting some of said rotatable cams, a cam on said first slide contacting a follower on said fourth slide, a transfer slide on said housing having a ratio cam at one end and a follower at the other end, said ratio cam contacting a follower on said third slide, said follower on said transfer slide contacting said tool slide, a follower on said supporting member and contacting another of said rotatable cams, and means biasing said cams and cam followers into engagement.

7. Apparatus for forming contours including a base, a housing mounted on said base for movement in one direction, a first slide on said housing and movable transversely of said housing, a second slide supporting a tool mounted on and movable transversely of said first slide, cams rotatably mounted on said housing, a third slide on said housing, cam and follower means on said first and third slides connecting one of said rotatable cams and said first slide to control movement of said first slide, a fourth slide on said base, a fifth slide on said housing and movable in the same direction as said second slide, said fourth and fifth slides having follower and cam means for connecting another of said rotatable cams to said second slide to control movement of said second slide, said second slide having a cam surface extending transversely of the movement of said second slide, said fifth slide having a follower in contact with said last cam surface, said third and fourth slides being movable relative to said housing in said one direction.

8. Apparatus for forming contours including a base, a housing slidably mounted on said base for movement in one direction, a first slide on said housing and movable transversely of said housing, a second slide supporting a tool mounted on and movable transversely of said first slide, cams rotatably mounted on said housing, a third slide on said housing movable relative thereto in said one direction, cam and follower means on said first and third slides connecting one of said rotatable cams and said first slide to control movement of said first slide, a fourth slide on said base movable relative to said housing in said one direction, a fifth slide on said housing, said fourth and fifth slides having follower and cam means for connecting another of said rotatable cams to said second slide to control movement of said second slide, another of said rotatable cams co-operating with said base to control movement of said housing.

9. Apparatus for forming contours including a base, a housing slidably mounted on said base for movement in one direction, a first slide on said housing and movable transversely of said housing, a second slide supporting a tool and mounted on and movable transversely of said first slide, cams rotatably mounted on said housing, a third slide on said housing movable relative thereto in said one direction, a cam on said first slide, follower means on each end of said third slide contacting one of said rotatable cams and the cam on said first slide to control movement of said first slide, a fourth slide on said base movable relative to said housing in said one direction, a fifth slide on said housing, said fourth and fifth slides having follower and cam means for connecting another of said rotatable cams to said second slide to control movement of said second slide, said second slide having a cam surface extending transversely of the movement of said second slide, said fifth slide having a follower in contact with said last cam surface, a follower fixed to said base, and another of said rotatable cams contacting said follower on said base to control movement of said housing.

References Cited in the file of this patent
UNITED STATES PATENTS

| | | |
|---|---|---|
| 2,660,930 | De Vlieg et al. | Dec. 1, 1953 |
| 2,872,853 | Hoern | Feb. 10, 1959 |

FOREIGN PATENTS

| | | |
|---|---|---|
| 274,044 | Switzerland | July 16, 1951 |